Sept. 27, 1938. A. VOSS 2,131,395
KITCHEN SCISSORS
Filed Jan. 27, 1937
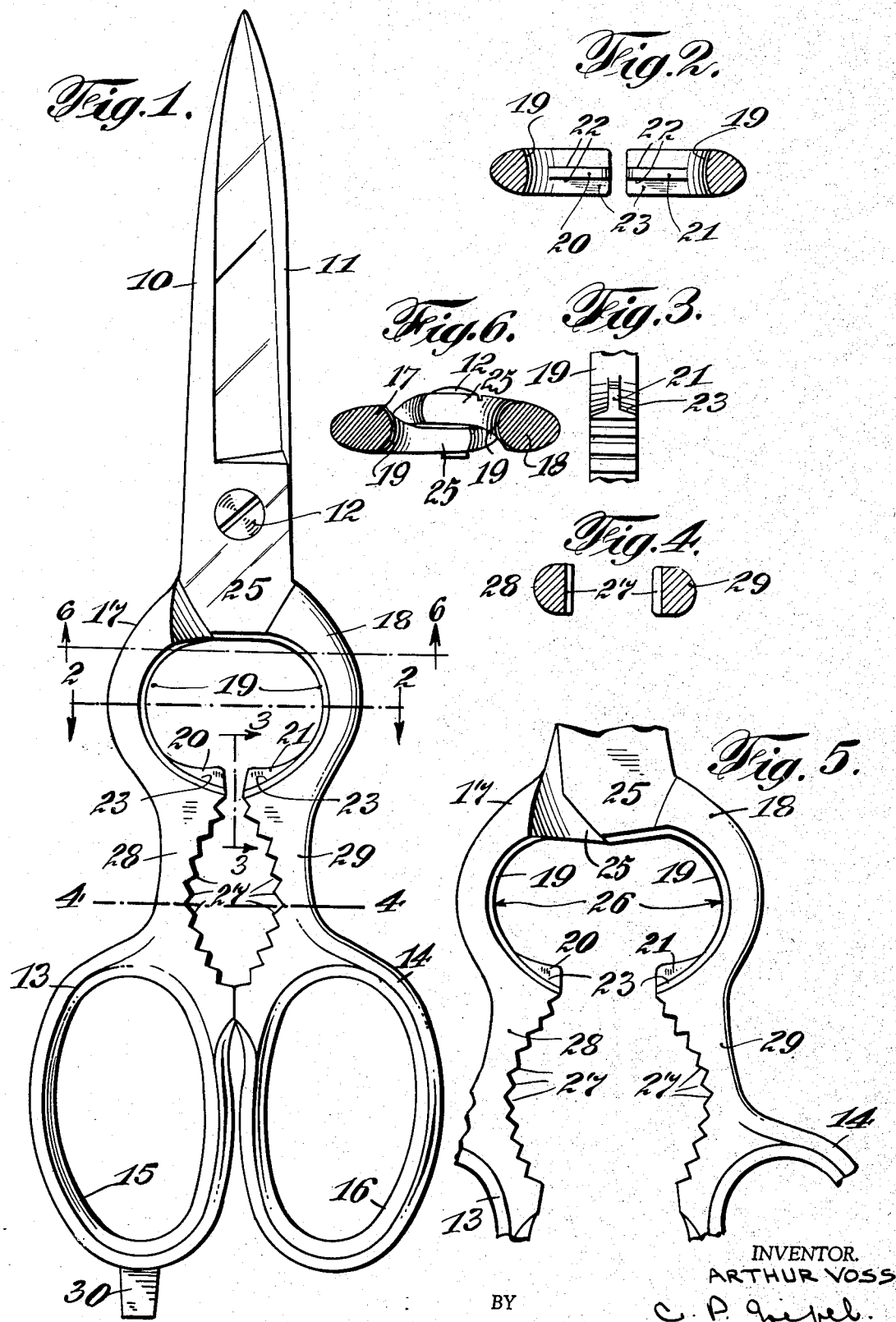
INVENTOR.
ARTHUR VOSS
BY C. P. Giepel.
his ATTORNEY.

Patented Sept. 27, 1938

2,131,395

UNITED STATES PATENT OFFICE 2,131,395

KITCHEN SCISSORS

Arthur Voss, Yonkers, N. Y., assignor to Graef & Schmidt, Inc., New York, N. Y., a corporation of New York Application January 27, 1937, Serial No. 122,484

2 Claims. (Cl. 65—46)

This invention has for its object to provide a suitable scissors or shears of sufficient strength combined with devices which will enable the scissors to be used for kitchen use and other utility, such as a cap-lifter and jar opener.

The invention consists in having a section of the handle portions of the scissors flared in such manner that they may be applied to any size cap or bottle top, or jar or like receptacle, and such flared portions will thereby serve as a grip to enclose or clamp the cap or top of a bottle or like receptacle by a lever action which will instantly and effectively remove the same. These flared portions are also provided with members which engage the cap or top closure so that by a lever action of the scissors as a whole, the cap or closure may be removed. My improved shears also embodies on an inner section of each handle portion complementary cap-engaging devices by which caps may be readily removed. An additional feature of my improvements is an extension on one of the handle portions of the shears by which it is possible to pry open lids or tops of bottles, jars and the like which usually resist the usual manual operation.

The invention will be more fully described hereinafter, an embodiment thereof shown in the drawing, and the invention will be finally pointed out in the claims.

In the accompanying drawing:—

Figure 1 is a side view of my improved kitchen scissors or shears in closed position, showing in combination therewith, my improved cap opener and remover;

Figure 2 is a horizontal section on line 2—2 of Fig. 1;

Figure 3 is a view taken on line 3—3 of Fig. 1;

Figure 4 is a horizontal section taken on line 4—4 of Fig. 1;

Figure 5 is a partial view of the structure shown in Fig. 1, showing a bottle-cap-opening device in extended position; and Figure 6 is a detail view from line 2—2 of Figure 1, seen in a direction opposite to the arrows thereof.

Similar numerals refer to similar parts throughout the several views.

Referring to the drawing, and more particularly to Figure 1, the kitchen shears of my invention consists of the usual cutting blades 10 and 11 pivoted at 12, each of which is provided with the usual handle portions 13 and 14, the finger-holding portions of which are designated by numerals 15 and 16, in well-known manner.

In distinction to kitchen shears heretofore in use, my improved shears illustrated in Figure 1, has embodied therein, two outwardly flaring members 17 and 18, which members are positioned close to the pivoted blades 12, and are curved or flared as indicated by reference character 19, the radius of curvature being such that these two flared members may be applied over the top of a bottle cap and the cap is then inserted in the space formed by such flared or curved portions 17 and 18. The flared portions 17 and 18 at their lower parts are provided with wedge members 20 and 21. Said wedge members have parallel sides 22 and are offset from the main body of the scissors by cut-out portions 23. In consequence, these wedge members 20 and 21 protrude sharply away from the body portion of the scissors and are free to engage the lowermost portion of the cap skirt. When it is desired to loosen or remove a cap the section 25 of the scissors immediately below the pivotal point 12 is placed upon the top of a cap and the wedge members 20 and 21 placed below the cap skirt and a lever action applied by moving upwardly the handles 13 and 14 with the shear portions 10 and 11 moved downwardly in respect to the bottle cap, by which operation the bottle cap is readily removed due to the lever action, the small arm or shorter portions being near the cap and the handles 13 and 14, constituting the longer arm of the lever portions extending considerably outwardly from the cap so that a slight force in an upward direction applied to the handles of the shears will influence the force exerted at the bottle cap and effect removal of the same with ease. From the drawing, it is seen that each blade 10 and 11 is provided with a projection 25 on the handle side of the pivot 12, which has a contour transverse to the median line of the scissors. These projections 25, when the handles are separated opening the scissor blades, and when the scissors are applied to act as a cap opener, rest on the top of the cap.

In cases in which the cap is larger than the opener provided by a usual scissors as shown in Fig. 1, the handles 13 and 14 may be spread sufficiently from one another and then the enlarged space designated by 26 is utilized to enable the wedge portions 20 and 21 to grip the same side of the cap to be removed. This enables the removal of an unusually large size cap. The parallel sides 20 and 21 are so arranged that they may be entered below the cap skirt and thereby obtain a good grip and the use of handles 13 and 14 by lever action creates considerable force to facilitate removal of the cap.

It has been found that certain kinds of caps used on bottles or jars are difficult of removal since they do not respond to turning operation by hand. My invention includes a new device by which such caps are readily removed, and consists of serrated portions 27 positioned along the intermediate handle portions 28 and 29. It will be noted that these serrated portions are arranged in circular shape and a slight opening of the handle portions permits the opening of a large size can by the proper functioning of these complementary serrated portions 28 and 29.

An additional feature of my improved shears will be seen in handle 13, which is provided with an extension 30 capable of use to pry open lids and the like on various sizes of cans.

It will be seen that my improved shears in construction resemble very closely the ordinary scissors or shears and has in combination therewith my new cap opener made up of wedge members 20 and 21, the combination of which does not materially change the new construction from that of an ordinary shears which is due to the fact that the bottle cap opening device is positioned close to the pivoted portions and due to the feature of outwardly flared portions the device is arranged in alignment with the longitudinal line of the scissors proper.

The improved scissors has the wedge members 20 and 21 disposed centrally of the flared portions 19 of the handles so that the device may be applied to a bottle cap from either or both of its sides. This facilitates the handling of the device in the removal of bottle caps.

It will also be noted that the wedge members 20 and 21, form with the innermost portions of the blades, diametrically opposite to the wedge members, a substantially diagonal holding device, which either in the position shown in Fig. 1, for the size of a screwcap corresponding thereto, or in the variable position shown in Fig. 5, for any size of screwcap corresponding thereto, may be used for the removal of screw caps. It will be noted that in Fig. 5, the innermost ends of the blades, form pointed portions, which with the two wedge members, form a triangular grip.

The device described provides a very convenient utensil in kitchen use and it may be manufactured at small cost and at the same time presents all the advantages of a bottle or jar opener.

I have described several embodiments of my invention, but it will be clear that changes may be made within the invention described without departing from the scope of the subjoined claims.

I claim:

1. In a kitchen utensil, a pair of matched members pivoted to each other by a pivot shaft transverse to the length of the members, and reversed in respect to a median line passing through the pivot shaft, each member having a handle portion, and each member having disposed between the pivot shaft and its handle portion close to the pivot shaft a section having a contour extending transverse to the length of said member, a reentrant curved portion bulging outwardly of said median line and merging with said contour, and terminating close to said median line, and a wedge-shaped lug at the said termination and projecting from said curved portion towards said pivot shaft, whereby when the utensil is applied to a bottle cap, the transverse section resting upon the cap acts as a fulcrum, and the wedge-shaped lugs engaging below the skirt of the cap, an upward pull on the handle portions enables the cap to be removed by lever action, the openable handle portions adapting said utensil to the removal of different sized caps.

2. A kitchen utensil as defined in claim 1, in which the lugs project from said curved portion midway of its depth.

ARTHUR VOSS.